(12) United States Patent
Nishi (10) Patent No.: US 7,417,639 B2
(45) Date of Patent: Aug. 26, 2008

(54) DRAWING DEVICE AND INFORMATION PROCESSING APPARATUS

(75) Inventor: Hidefumi Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/114,046

(22) Filed: Apr. 3, 2002

(65) Prior Publication Data

US 2003/0076333 A1 Apr. 24, 2003

(30) Foreign Application Priority Data

Oct. 23, 2001 (JP) ............................... 2001-324768

(51) Int. Cl.
*G06T 11/40* (2006.01)
(52) U.S. Cl. ..................... 345/552; 345/564; 345/568; 345/572; 345/582; 345/609; 382/260
(58) Field of Classification Search ......... 345/581–582, 345/568–569, 552, 564, 572, 544
See application file for complete search history.

(56) References Cited

U.S. PATENT DOCUMENTS

| | | | |
|---|---|---|---|
| 5,689,592 A | | 11/1997 | Ericsson et al. |
| 5,886,705 A | * | 3/1999 | Lentz ........................... 345/582 |
| 5,977,994 A | | 11/1999 | Greenberg et al. |
| 6,002,407 A | * | 12/1999 | Fadden ........................ 345/582 |
| 6,084,601 A | * | 7/2000 | Thayer ........................ 345/564 |
| 6,353,438 B1 | * | 3/2002 | Van Hook et al. ........... 345/552 |
| 6,614,443 B1 | * | 9/2003 | Peterson ...................... 345/569 |

FOREIGN PATENT DOCUMENTS

| | | |
|---|---|---|
| EP | 0 345 672 | 12/1989 |
| EP | 0 810 553 | 12/1997 |
| JP | 11-154237 | 6/1999 |
| JP | 11-272548 | 10/1999 |

OTHER PUBLICATIONS

Japan Abstract, 11-272548, Oct. 8, 1999.
Search Report for corresponding European Appln. No. 02252713.9.

* cited by examiner

*Primary Examiner*—Kee M. Tung
*Assistant Examiner*—Antonio A. Caschera
(74) *Attorney, Agent, or Firm*—Staas & Halsey LLP (57) ABSTRACT

There are provided a drawing device and an information processing apparatus which are capable of reading out texture data from a memory at a high speed. A storage circuit stores respective information items of each of texture pixels constituting the texture data and at least one texture pixel in a vicinity of the each of the texture pixels, in a continuously-accessible region thereof. An address calculation circuit calculates, based on texture coordinates corresponding to each pixel of the polygons, an address where a corresponding set of the information items are stored. A readout circuit reads out the corresponding set of the information items from the address calculated by the address calculation circuit. A synthesis circuit synthesizes the corresponding set of the information items read out by the readout circuit. A drawing circuit draws, based on texture pixel information synthesized by the synthesis circuit, a corresponding pixel of the polygons.

7 Claims, 8 Drawing Sheets

| D06 | D07 | D14 | D15 | D07 | D00 | D08 | D15 | D08 |
|-----|-----|-----|-----|-----|-----|-----|-----|-----|
| D14 | D15 | D12 | D13 | D15 | D08 | D00 | D23 | D16 |
| D22 | D23 | D30 | D31 | D23 | D16 | D08 | D31 | D24 |
| D30 | D31 | D38 | D39 | D31 | D24 | D16 | D39 | D32 |
| D38 | D39 | D46 | D47 | D39 | D32 | D24 | D47 | D40 |
| D46 | D47 | D54 | D55 | D47 | D40 | D32 | D55 | D48 |
| D54 | D55 | D62 | D63 | D55 | D48 | D40 | D63 | D56 |
| D62 | D63 | D06 | D07 | D63 | D56 | D48 | D07 | D00 |

... ... ... ... ... ... ... ...

| D00 | D01 | D08 | D09 | D01 | D02 | D09 | D10 |
|-----|-----|-----|-----|-----|-----|-----|-----|
| D08 | D09 | D16 | D17 | D09 | D10 | D17 | D18 |
| D16 | D17 | D24 | D25 | D17 | D18 | D25 | D26 |
| D24 | D25 | D32 | D33 | D25 | D26 | D33 | D34 |
| D32 | D33 | D40 | D41 | D33 | D34 | D41 | D42 |
| D40 | D41 | D48 | D49 | D41 | D42 | D49 | D50 |
| D48 | D49 | D56 | D57 | D49 | D50 | D57 | D58 |
| D56 | D57 | D00 | D01 | D57 | D58 | D01 | D02 |

| D00 | D01 | D02 | D03 | D04 | D05 | D06 | D07 |
|-----|-----|-----|-----|-----|-----|-----|-----|
| D08 | D09 | D10 | D11 | D12 | D13 | D14 | D15 |
| D16 | D17 | D18 | D19 | D20 | D21 | D22 | D23 |
| D24 | D25 | D26 | D27 | D28 | D29 | D30 | D31 |
| D32 | D33 | D34 | D35 | D36 | D37 | D38 | D39 |
| D40 | D41 | D42 | D43 | D44 | D45 | D46 | D47 |
| D48 | D49 | D50 | D51 | D52 | D53 | D54 | D55 |
| D56 | D57 | D58 | D59 | D60 | D61 | D62 | D63 |

FIG. 8
PRIOR ART

DRAWING DEVICE AND INFORMATION PROCESSING APPARATUS

BACKGROUND OF THE INVENTION (1) Field of the Invention

This invention relates to a drawing device and an information processing apparatus, and more particularly to a drawing device and an information processing apparatus that regard an object to be drawn as a collection of a plurality of polygons, and map texture data onto polygons, respectively, to thereby draw the object.

(2) Description of the Related Art

When an information processing apparatus draws a two-dimensional or three-dimensional image, the apparatus represents the image to be drawn as a collection of a plurality of polygons by modeling, and pastes image data called a texture onto each polygon by mapping, whereby the apparatus can draw the image such that it gives a real sense of texture.

Now, when such textures are enlarged and pasted to an object to be drawn, simple enlargement of the textures results in reproduction of a coarser image. To overcome this problem, colors surrounding each point (pixel) to be drawn are weighted and averaged in drawing the object. This blurs boundaries between colors of the textures, and hence the coarseness of the image can be made less conspicuous. This processing is called "bilinear filtering".

Figure 7:
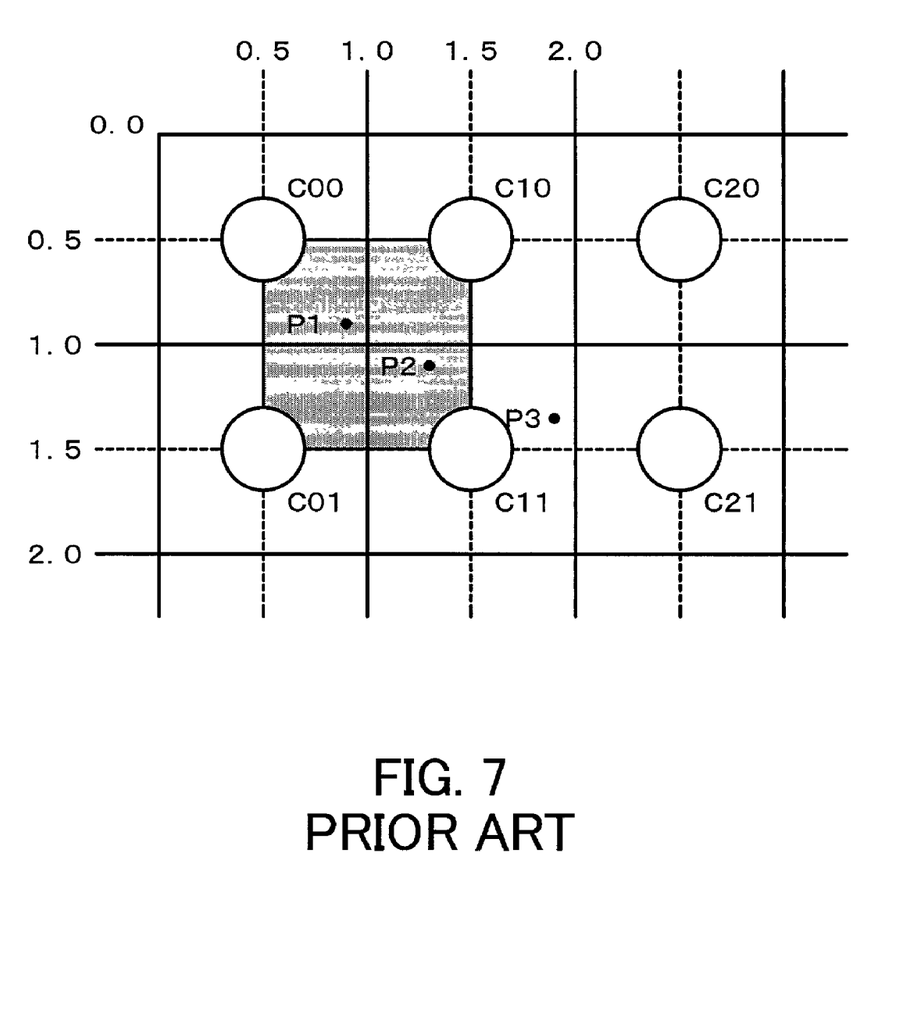
FIG. 7 is a diagram useful in explaining the principles of a conventional bilinear filtering process.

FIG. 7 is a diagram useful in explaining the principles of bilinear filtering. In FIG. 7, reference numerals P1 to P3 designate pixels, and reference numerals C00, C10, C20, C01, C11, C21 designate texture pixels (texels), respectively.

For instance, a case in which the pixel P1 is drawn will be considered. In bilinear filtering, the texels C00, C10, C01, C11 are multiplied by respective weights determined according to the distances of the texels from the pixel P1, and the products of the multiplications are added up to determine a value indicative of the color information of the pixel P1. For instance, the color information of the pixel P1 is determined by the following equation (1):

$$P1 = C00 \times 0.6 + C10 \times 0.5 + C01 \times 0.5 + C11 \times 0.4 \tag{1}$$

where C00, C01, C10, C11 represent respective information items of corresponding texels.

As described above, in bilinear filtering, the color of the pixel P1 is determined by taking a weighed average of colors surrounding the pixel P1. This blurs the boundaries between the color of the texture corresponding to the pixel P1 and the neighboring colors, whereby the coarseness of the image can be made less conspicuous.

Figure 8:
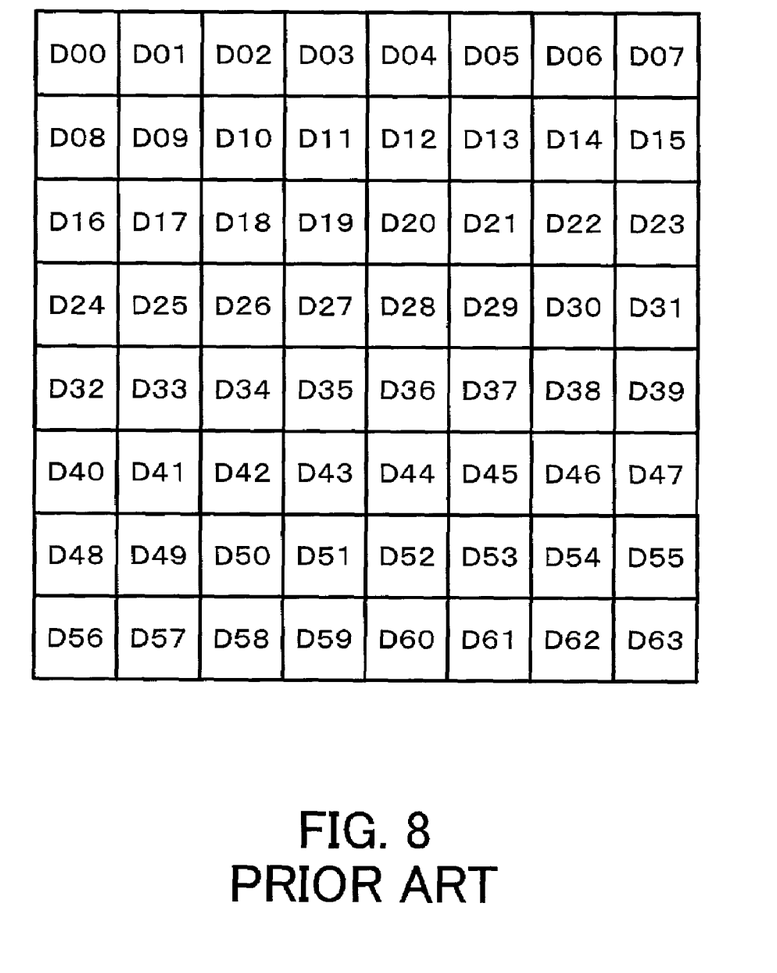
FIG. 8 is a diagram showing a form in which texture data having a size of 8×8 data is stored in a memory.

FIG. 8 is a diagram showing a form in which texture data having a size of 8 by 8 data is stored in a memory. As shown in FIG. 8, texture data having a size of 8 by 8 data is formed by 64 texel information items D00 to D63, and hence these items are sequentially stored in respective addresses of the memory in this order of D00 to D63.

Therefore, the texels and the texel information items has correspondence between them such that C00 corresponds to D00, C10 corresponds to D01, C01 corresponds to D08, and so on.

In the above case, for instance, if texture coordinates corresponding to a pixel are (1.0, 1.0), four texel information items D00, D01, D08, D09 are required for performing bilinear filtering processing. In this case, a pair of information items D00 and D01, and a pair of information items D08 and D09 are stored in respective pairs of successive addresses, and hence there is a high possibility that each pair of information items can be read out by one readout operation. However, since one pair of addresses storing one pair of information items are remote from the other pair of addresses storing the other pair of information items, it is necessary to carry out at least two readout operations so as to read out all the four texel information items.

Further, if texel information items forming each pair are stored in addresses corresponding to two successive access units of the memory in a straddling fashion, it is necessary to access the memory three or four times.

Therefore, in the above conventional method, the need for accessing the memory a plurality of times arises to read out texel information items necessary for carrying out one bilinear filtering operation, so that it is difficult to enhance the operating speed of the information processing apparatus.

SUMMARY OF THE INVENTION

The present invention has been made in view of these circumstances, and an object thereof is to provide a drawing device and an information processing apparatus which are capable of carrying out high-speed bilinear filtering processing.

To attain the above object, there is provided a drawing device that regards an object to be drawn as a collection of a plurality of polygons, and maps texture data onto the polygons, to thereby draw the object. The drawing device comprises a storage circuit for storing respective information items of each of texture pixels constituting the texture data and at least one texture pixel in a vicinity of the each of the texture pixels, in a continuously-accessible region thereof, an address calculation circuit for calculating, based on texture coordinates corresponding to each pixel of the polygons, an address where a corresponding set of the information items are stored, a readout circuit for reading out the corresponding set of the information items from the address calculated by the address calculation circuit, and a synthesis circuit for synthesizing the corresponding set of the information items read out by the readout circuit.

Further, to attain the above object, there is provided an information processing apparatus that regards an object to be drawn as a collection of a plurality of polygons, and maps texture data onto the polygons, to thereby draw the object. The information processing apparatus comprises a storage unit for storing respective information items of each of texture pixels constituting the texture data and at least one texture pixel in a vicinity of the each of the texture pixels, in a continuously-accessible region thereof, an address calculation unit for calculating, based on texture coordinates corresponding to each pixel of the polygons, an address where a corresponding set of the information items are stored, a readout unit for reading out the corresponding set of the information items from the address calculated by the address calculation unit, and a synthesis unit for synthesizing the corresponding set of the information items read out by the readout unit.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

The invention will now be described in detail with reference to drawings showing a preferred embodiment thereof.

Figure 1:
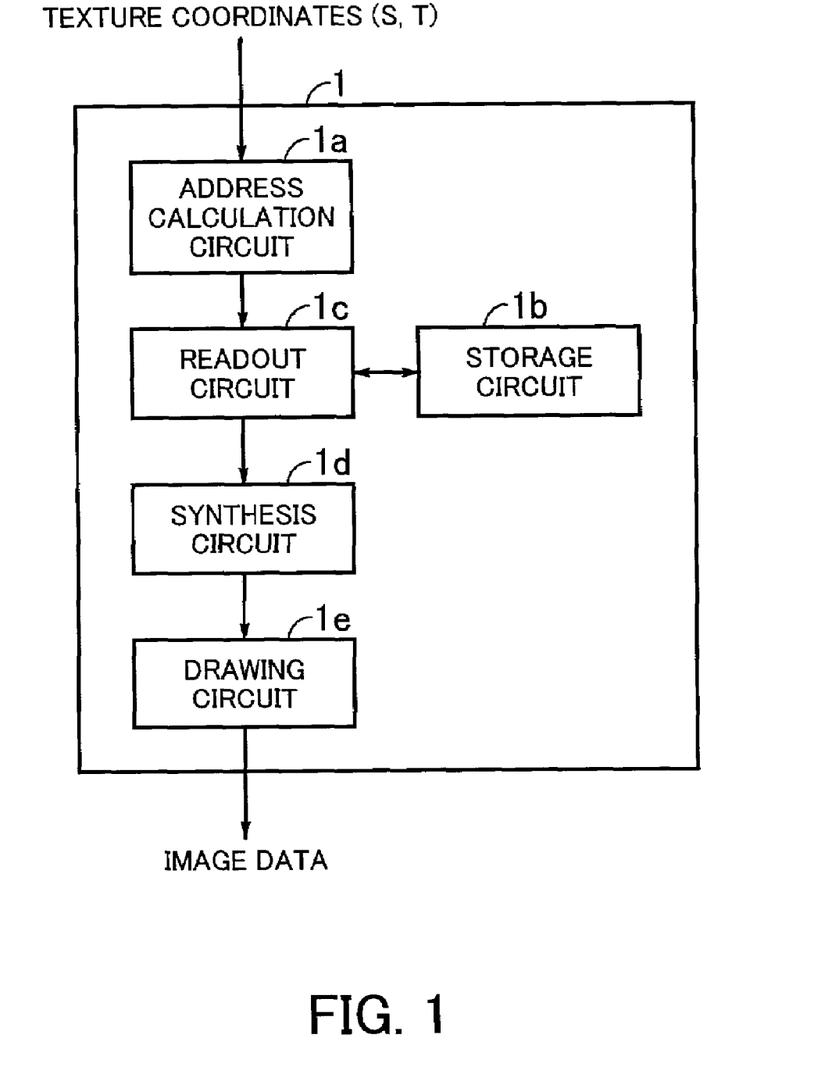
FIG. 1 is a block diagram useful in explaining operating principles of the present invention.

FIG. 1 is a block diagram showing the operating principles of the present invention. As shown in FIG. 1, a drawing device 1 according to the present invention is comprised of an address calculation circuit 1a, a storage circuit 1b, a readout circuit 1c, a synthesis circuit 1d, and a drawing circuit 1e.

The storage circuit 1b stores respective information items of each of texture pixels (hereinafter, "texture pixel" is referred to as "texel") constituting the texture data and at least one texel in a vicinity of the each of the texels, in a continuously-accessible region thereof.

The address calculation circuit 1a calculates, based on texture coordinates corresponding to each pixel of the polygons, an address where a corresponding set of the information items are stored.

The readout circuit 1c reads out the corresponding set of the information items from the address calculated by the address calculation circuit 1a.

The synthesis circuit 1d synthesizes the corresponding set of the information items read out by the readout circuit 1c.

The drawing circuit 1e draws, based on texel information synthesized by the synthesis circuit 1d, a corresponding pixel of the polygons.

Next, the operations of the drawing device whose operating principles are illustrated in FIG. 1 will be described in detail hereinafter.

First, in a stage prior to performing a drawing process, texture data for use in the drawing process is stored in the storage circuit 1b. The storing of the texture data having information items of texture pixels is performed similar to bilinear filtering described above in connection with the prior art. For example, when texture coordinates are (1.0, 1.0), it is necessary to read out four texture information items D00, D01, D08, D09 appearing in FIG. 8 so as to carry out bilinear filtering. However, according to an aspect of the present invention, the four data (information) items, D00, D01, D08, D09 for instance, are packed, and stored in advance in a region of the storage circuit 1b such that they can be read out by accessing the storage circuit 1b only once. It should be noted that in the following, each set of packed texel information items is simply referred to as a "packed texel".

Further, four data items D01, D02, D09, D10 corresponding to texture coordinates (2.0, 1.0) are stored as a packed texel in an area next to the region where the first-mentioned four data items are stored. The packed texels corresponding to areas from the texture coordinates (1.0, 1.0) to texture coordinates (8.0, 8.0) are thus sequentially stored in the storage circuit 1b.

In this state, when texture coordinates (S, T) corresponding to a polygon to be drawn are input, the address calculation circuit 1a calculates an address of a region where a corresponding packed texel is stored, based on the input texture coordinates (S, T). The address calculation circuit 1a calculates the address of the region where the corresponding packed texel is stored by pointing to a start address of a packed texel corresponding to texture coordinates (S, T).

For instance, if coordinates (1.0. 1.0) are input as texture coordinates, the address calculation circuit is calculates a start address of a region where the packed texel formed by the four texel information items of D00, D01, D08, D09 is stored by pointing to the start address of the corresponding region of texture coordinates (1.0. 1.0) that is determined by the storage circuit 1b for storing the four texel information items of D00, D01, D08, D09. Similarly, if coordinates (2.0. 1.0) are input as texture coordinates, the address calculation circuit 1a calculates a start address of a region where the packed texel formed by the four texel information items of D01, D02, D03, D10 is stored by pointing to the start address of the corresponding region of texture coordinates (2.0. 1.0) that is determined by the storage circuit 1b for storing the four texel information items of D01, D02, D03, D10.

The readout circuit 1c is supplied with the start address for the packed texel from the address calculation circuit 1a, and reads out the packed texel from the corresponding addresses of the storage circuit 1b. More specifically, the readout circuit 1c obtains the four texel information items of D00, D01, D08, D09.

The synthesis circuit 1d takes a weighted average of the four texel information items read out by the readout circuit 1c, thereby producing color information of a pixel corresponding to the texture coordinates (S, T).

The drawing circuit 1e looks up the color information produced by the synthesis circuit 1d to draw the corresponding pixel.

As described hereinabove, according to the drawing device of the present invention, four texel information items required for bilinear filtering processing are packed to form a packed texel, and then the packed texel is stored in a region of the storage circuit 1b, which permits the texel information items to be read out continuously such that they can be read out by accessing the storage circuit only once. This makes it possible to shorten a time period required for each readout operation, thereby attaining an increased speed of the drawing process.

Next, the embodiment according to the invention will be described hereinafter.

Figure 2:
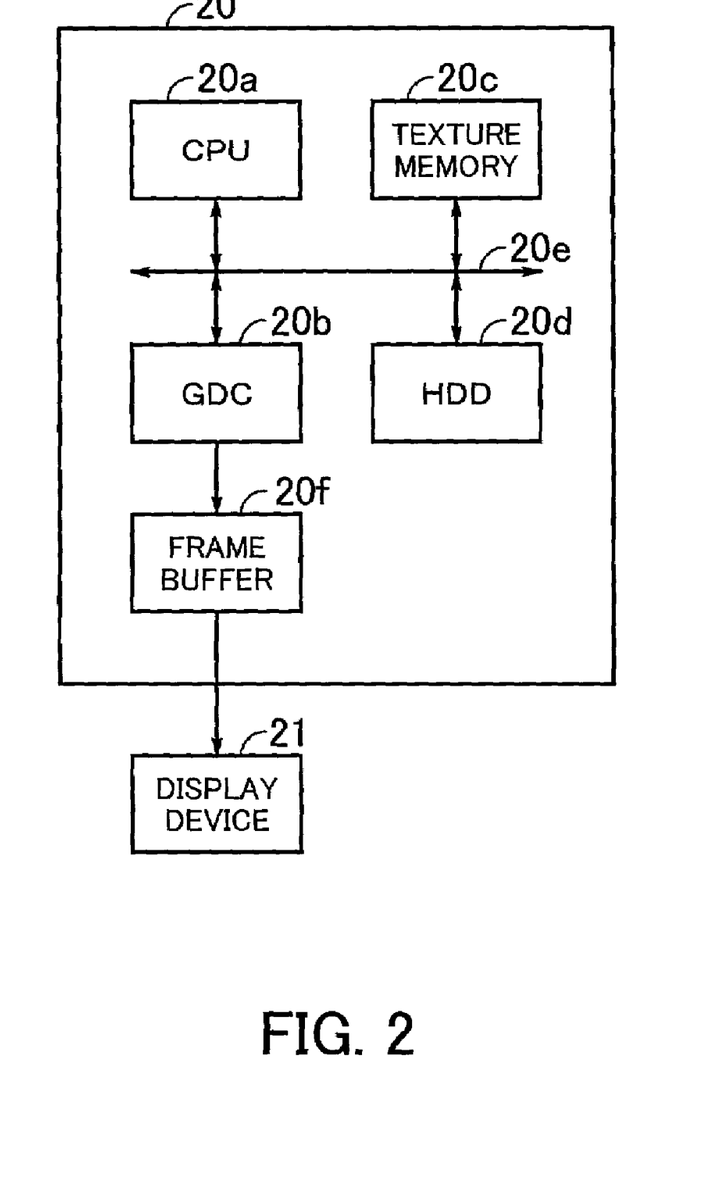
FIG. 2 is a block diagram showing an example of the arrangement of an embodiment according to the present invention.

FIG. 2 shows an example of the arrangement of an information processing apparatus according to the embodiment of the invention. As shown in FIG. 2, the information processing apparatus 20 according to the embodiment is comprised of a CPU (Central Processing Unit) 20a, a GDC (Graphic Display Controller) 20b, a texture memory 20c, an HDD (Hard Disk Drive) 20d, a bus 20e, and a frame buffer 20f. The information processing apparatus 20 is connected to an external display device 21. It should be noted that the information processing apparatus 20 means an information processing apparatus having a drawing processing function, such as a personal computer (PC), a cellular phone, and a car navigation system.

Here, the CPU 20a carries out various kinds of arithmetic operations according to programs stored in the HDD 20d and controls operations of components of the apparatus.

The GDC 20b draws an object to be drawn, as a collection of a plurality of polygons according to drawing instructions provided by the CPU 20a, and pastes textures stored in the texture memory 20c onto polygons.

As will be described in detail hereinafter, the texture memory 20c stores packed texels each formed by packing four texel information items in a manner associated with predetermined texture coordinates, and responsive to a read-out request from the GDC 20b, reads out a corresponding one of the packed texels to supply the same to the GDC 20b.

The HDD 20d stores packed texels, and programs for execution by the CPU 20a.

The bus 20e connects the CPU 20a, the GDC 20b, the texture memory 20c, and the HDD 20d to each other, thereby enabling transfer of data therebetween.

The frame buffer 20f stores image data produced by a drawing process carried out by the GDC 20b, frame by frame, and converts the image data to a video signal to deliver the video signal to the display device 21.

The display device 21 is implemented e.g. by a CRT (Cathode Ray Tube) monitor or an LCD (Liquid Crystal Display), and displays an image based on the video signal output from the frame buffer 20f.

Next, details of the arrangement of the GDC 20b illustrated in FIG. 2 will be described with reference to FIG. 3.

Figure 3:
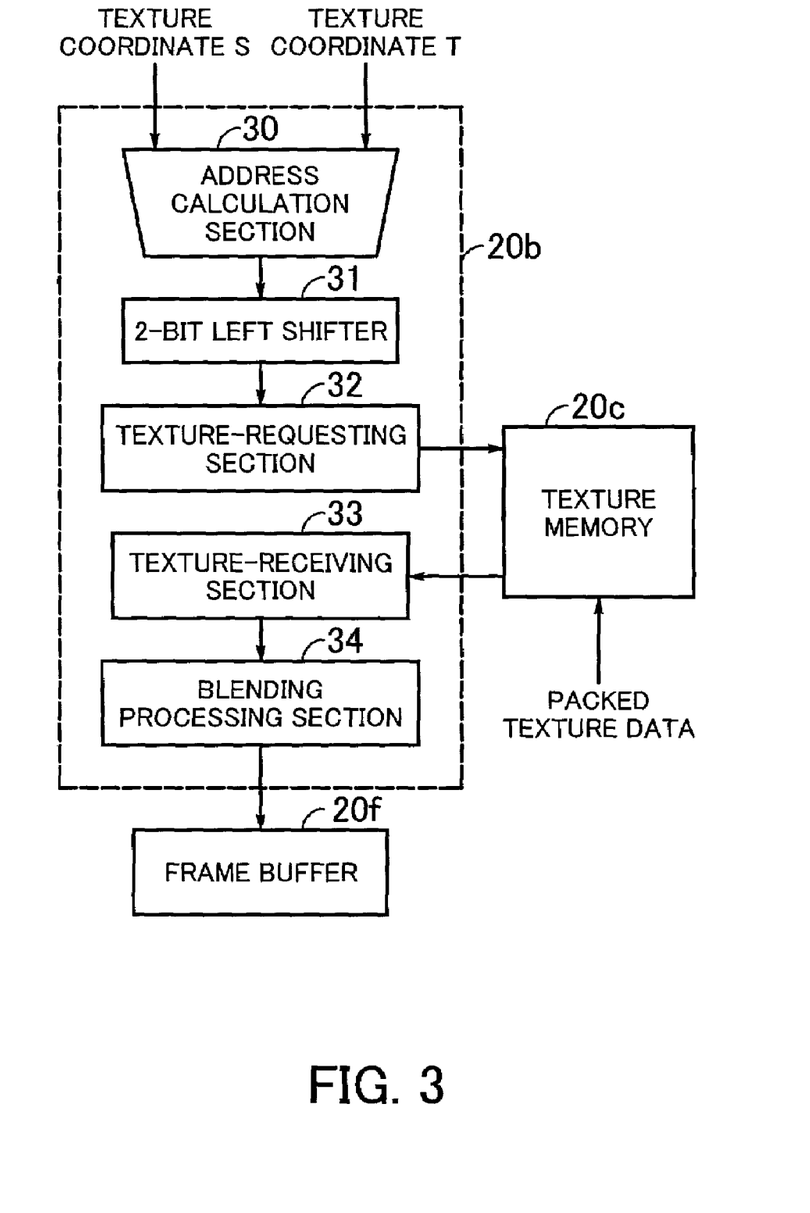
FIG. 3 is a block diagram showing an example of the arrangement of a GDC appearing in FIG. 2.

As shown in FIG. 3, the GDC 20b is comprised of an address calculation section 30, a 2-bit left shifter 31, a texture-requesting section 32, a texture-receiving section 33, and a blending processing section 34. The GDC 20b accesses the texture memory 20c, and writes color information obtained through a blending process in the frame buffer 20f.

During the above process, the address calculation section 30 receives a texture coordinate S and a texture coordinate T, and calculates data specifying a corresponding texel to output the data.

The 2-bit left shifter 31 obtains data by shifting left by two bits the data specifying the texel, which is received from the address calculation section 30, and outputs the obtained data as address data.

The texture-requesting section 32 requests the texture memory 20c to read out a packed texel from a region the start address of which corresponds to the address data output from the 2-bit left shifter 31.

The texture memory 20c reads out packed texels each formed by packing four texel information items, as described above, from the HDD 20d for storage.

Figure 4:
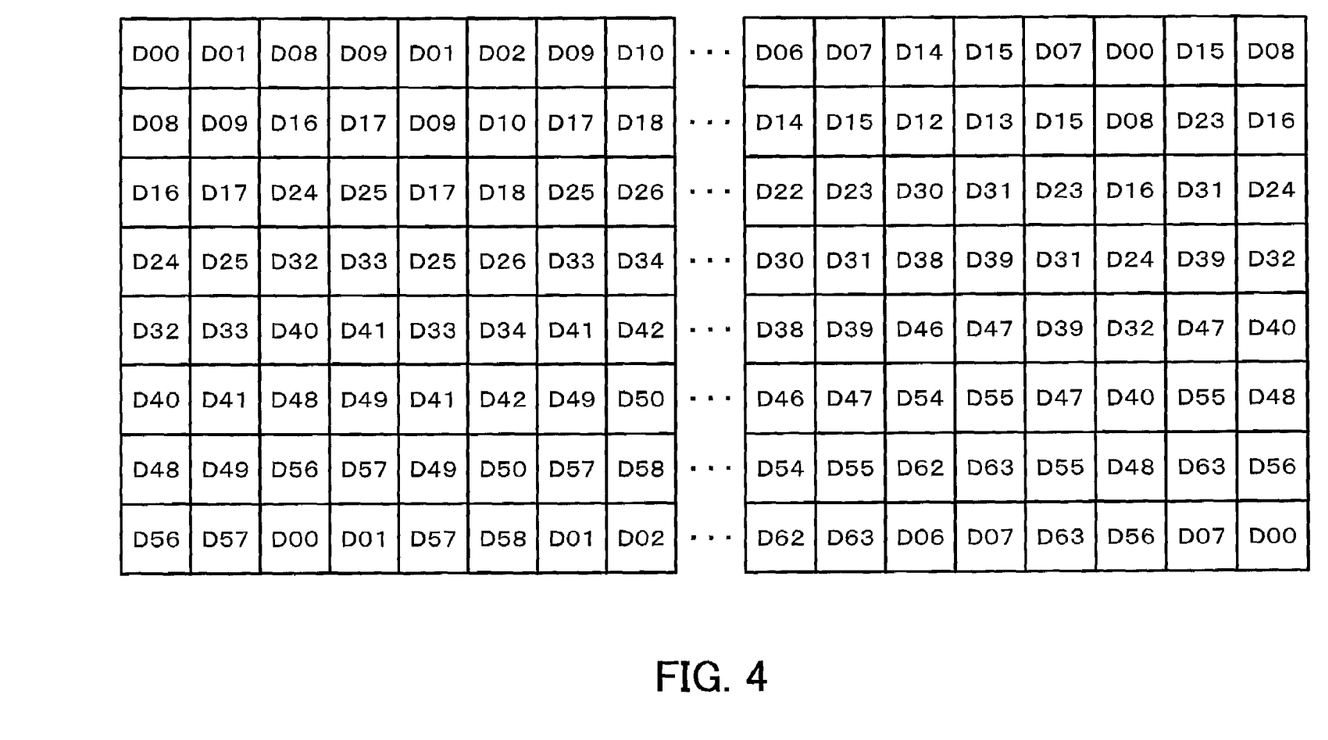
FIG. 4 is a diagram showing an example of packed texels stored in a texture memory appearing in FIG. 2.

FIG. 4 shows an example of packed texels stored in the texture memory 20c. In FIG. 4, boxes at intersections of columns and rows correspond to respective addresses in the texture memory 20c, and respective information texel items which are associated with the respective boxes are stored in this order in the texture memory 20c. Further, in the illustrated example, the packed texel corresponding to the texture coordinates (1.0, 1.0) is stored in addresses corresponding to respective boxes on the first to fourth columns in the first row, while the packed texel corresponding to the texture coordinates (2.0, 1.0) is stored in addresses corresponding to respective boxes on the fifth to eighth columns in the first row. A packed texel corresponding to the texture coordinates (8.0, 1.0) is stored in addresses corresponding to respective boxes on the fourth to last columns from the end of the first row. Further, a packed texel corresponding to the texture coordinates (1.0, 2.0) is stored in addresses corresponding to respective boxes on the first to fourth columns in the second row. The following packed texels are stored in a similar order.

It should be noted that packed texels as described above are also stored in the HDD 20d in the same manner as illustrated in FIG. 4, and the texture memory 20c reads out the same as required from the HDD 20d for storage in a predetermined region thereof.

The texture-receiving section 33 receives a packed texel read out from the texture memory 20c to supply the same to the blending processing section 34.

The blending processing section 34 takes a weighted average of four texel information items forming a packed texel supplied from the texture-receiving section 33, thereby producing color information of a pixel to deliver the same to the frame buffer 20f.

The frame buffer 20f stores the color information of the pixel supplied from the blending processing section 34 in a corresponding address, and synthesizes image data corresponding to one frame, followed by delivering the image data to the display device 21.

Next, the operations carried out by the embodiment constructed as above will be described.

Responsive to an instruction from the CPU 20a requesting mapping of predetermined textures onto predetermined polygons, the HDD 20d reads out corresponding packed texels to store the same in a predetermined region of the texture memory 20c. Further, as described hereinbefore, the packet texels stored in the HDD 20d are in a form as shown in FIG. 4, and hence the data read out from the HDD 20d are stored in the texture memory 20c as they are.

Next, the GDC 20b calculates texture coordinates (S, T) based on the coordinates of a vertex of a polygon to be drawn, and supplies the texture coordinates (S, T) to the address calculation section 30.

The address calculation section 30 calculates the address of a corresponding texel based on the supplied texture coordinates (S, T). For instance, if the texture coordinates (2.0, 1.0) are input, the address calculation section 30 outputs a number "1" as the address S' for the 2-bit left shifter 31.

The 2-bit left shifter 31 shifts the address S' output from the address calculation section 30 left by two bits. In the above example, since the number "1" is output from the address calculation section 30, the 2-bit left shifter 31 provides the texture-requesting section 32 with a number "4" obtained by shifting the number "1" left by two bits. This number "4" is to be used as a horizontal address of the texture memory 20c of FIG. 4.

The texture-requesting section 32 requests the texture memory 20c to read out a packed texel corresponding to the horizontal address "4" output from the 2-bit left shifter 31.

The texture memory 20c reads out a packed texel from a region starting at the horizontal address of which is "4", that is, the four texel information items D01, D02, D09, D10, and supplies the same to the texture-receiving section 33. At this time, for instance, if information of one packed texel is formed by 32 bits, and the texture memory 20c is compatible with an access data width of 32 bits, it is possible to read out the whole information of the one packed texel by one readout operation.

The texture-receiving section 33 receives the packed texel read out from the texture memory 20c to supply the same to the blending processing section 34.

Figure 5:
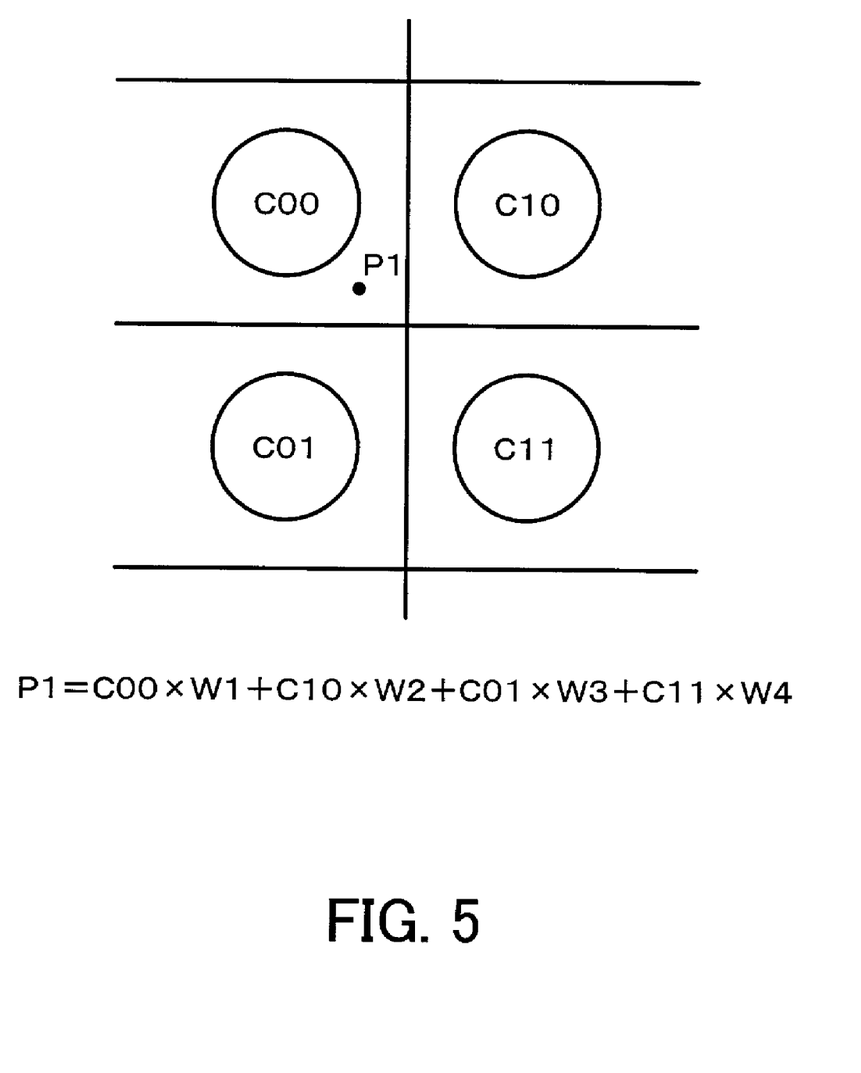
FIG. 5 is a diagram schematically showing an operation carried out by a blending processing section appearing in FIG. 3.

The blending processing section 34 takes a weights data items of the packed texel read out from the texture memory 20c according to the position of the pixel to be drawn, to thereby take a weighted average of the packed texel. FIG. 5 shows an example of weighted average processing carried out on a packed texel. In the illustrated example, texel information items D00, D01, D08, D09 corresponding to respective texels C00, C10, C01, C11 of the packed texel corresponding to the pixel P1 are read out, and multiplied by respective weighting coefficients W1, W2, W3, W4 defined according to the respective positions of the texels with respect to the pixel P1. Then, the respective products of the multiplications are added up to determine a value indicative of the color information of the pixel P1.

The color information thus determined is written in an address of the frame buffer 20f corresponding to the pixel P1. When the above processing is carried out on all the polygons, forming of image data corresponding to one frame is completed, and the frame buffer 20f converts the image data to a video signal and delivers the same to the display device 21.

As a result, an image thus drawn is displayed on the display device 21.

As described hereinabove, according to the present embodiment, as shown in FIG. 4, four texel information items corresponding to texture coordinates are packed, and stored in a sequence of successive addresses in the texture memory 20c as a packed texel such that all the information items in the packed texel can be read out by one readout operation. This makes it possible to shorten a time period required for each readout operation, thereby attaining an increased speed of the drawing process.

Figure 6:
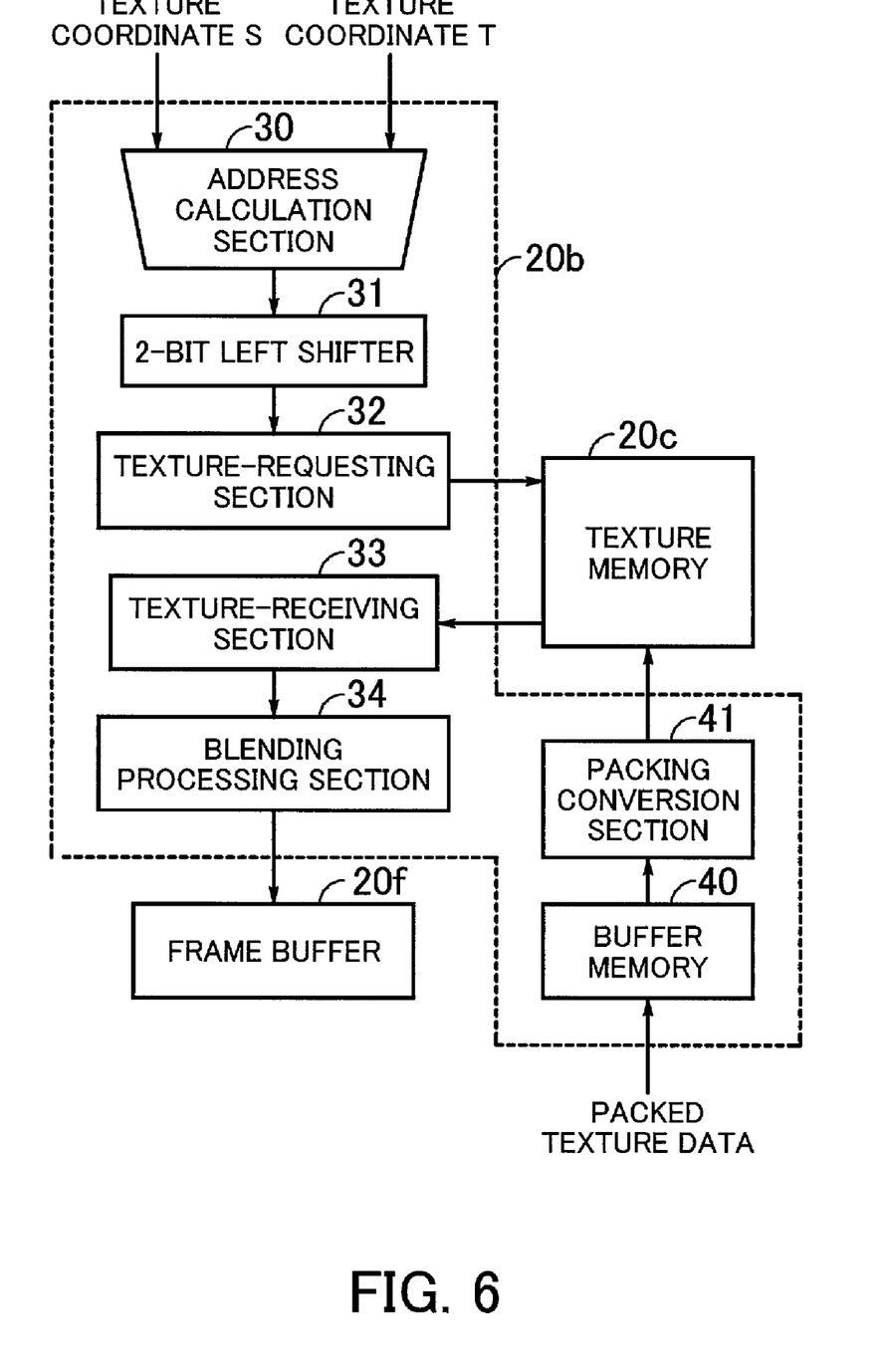
FIG. 6 is a block diagram showing another example of the arrangement of the GDC appearing in FIG. 2.

FIG. 6 shows another example of the arrangement of the GDC 20b.

This arrangement is distinguished from the example illustrated in FIG. 3 in that the GDC 20b includes the additional components of a buffer memory 40 and a packing conversion section 41. Further, a form for storing texel information (data) items in the HDD 20d is different from the above-described example. The remainder of the FIG. 6 arrangement is the same as the FIG. 3 arrangement.

The buffer memory 40 receives texture data for temporary storage, and then supplies the same to the packing conversion section 41.

The packing conversion section 41 packs texture data supplied from the buffer memory 40 to generate packed texels, and sequentially stores the packed texels in the texture memory 20c.

Further, texture data items stored in the HDD 20d are not packed texels the example of which is shown in FIG. 4, but texture data items before packing the example of which is shown in FIG. 8.

Next, operations carried out by the FIG. 6 GDC 20b will be described.

When the CPU 20a issues an instruction requesting mapping of predetermined textures onto predetermined polygons to the GDC 20b, the GDC 20b reads out corresponding textures from the HDD 20d to write them into the buffer memory 40.

Texture data items read into the buffer memory 40 are converted into packed texels by the packing conversion section 41. In other words, the packing conversion section 41 reads out texture data stored in the buffer memory 40 in the form as shown in FIG. 8, in a predetermined order, to thereby convert the texture data into packed texels as shown in FIG. 4.

The packed texels output from the packing conversion section 41 are supplied to the texture memory 20c and sequentially stored therein.

After the process described above has been terminated to complete storage of the packed texels in the texture memory 20c, the address calculation section 30 receives texture coordinates (S, T) and converts the same to address data.

The 2-bit left shifter 31 shifts the address data output from the address calculation section 30 left by two bits, and supplies the resulting data to the texture-requesting section 32.

The texture-requesting section 32 requests the texture memory 20c to read out a packed texel corresponding to the address data supplied from the 2-bit left shifter 31, from a region of the texture memory 20c an start address of which is an address corresponding to the address data.

The texture memory 20c reads out the packed texel requested by the texture-requesting section 32, and supplies the same to the texture-receiving section 33.

The texture-receiving section 33 receives the packed texel read out from the texture memory 20c to supply the same to the blending processing section 34.

The blending processing section 34 carries out weighted average processing, as shown in FIG. 5, on the packed texel which is supplied from the texture-receiving section 33 and contains four texel information items, thereby generating the color information of a corresponding pixel. Then, the blending processing section 34 writes the color information thus obtained into an address of the frame buffer 20f corresponding to the pixel.

After the drawing processing is carried out on all the polygons to complete forming of image data, the frame buffer 20f converts the image data to a video signal and delivers the same to the display device 21.

The display device 21 outputs the video signal supplied from the frame buffer 20f for display.

According to the above embodiment, texture data are converted to packed texels by the packing conversion section 41, and the packed texels are stored in the texture memory 20c. Hence, there is no need to prepare packed texels corresponding to all the textures in advance, which makes it possible to reduce the capacity of the HDD 20d.

Although in the above embodiment, texture data having a size of 8 by 8 data is described by way of example, it goes without saying that the present invention is by no means limited to such an example.

Further, although in the above embodiment, texture data are stored in the HDD 20d, this is not limitative, but texture data can be stored in a recording medium, such as a CD-ROM, and a semiconductor memory.

Further, the packed texels as shown in FIG. 4 are described only by way of example, and needless to say, the present invention is by no means limited to the example.

Furthermore, it goes without saying that the GDC 20b shown in FIG. 3 or 6 can be constructed as a semiconductor device or an expansion board, and products thereof can be merchandised as single or separate items.

As described hereinabove, according to the present invention, there is provided a drawing device that regards an object to be drawn as a collection of a plurality of polygons, and maps texture data onto the polygons, to thereby draw the object. The drawing device comprises a storage circuit for storing respective information items of each of texture pixels constituting the texture data and at least one texture pixel in a vicinity of the each of the texture pixels, in a continuously-accessible region thereof, an address calculation circuit for calculating, based on texture coordinates corresponding to each pixel of the polygons, an address where a corresponding set of the information items are stored, a readout circuit for reading out the corresponding set of the information items from the address calculated by the address calculation circuit, and a synthesis circuit for synthesizing the corresponding set of the information items read out by the readout circuit.

Further, according to the present invention, there is provided an information processing apparatus that regards an object to be drawn as a collection of a plurality of polygons, and maps texture data onto the polygons, to thereby draw the object. The information processing apparatus comprises a storage unit for storing respective information items of each of texture pixels constituting the texture data and at least one texture pixel in a vicinity of the each of the texture pixels, in a continuously-accessible region thereof, an address calculation unit for calculating, based on texture coordinates corresponding to each pixel of the polygons, an address where a corresponding set of the information items are stored, a readout unit for reading out the corresponding set of the information items from the address calculated by the address calculation unit, and a synthesis unit for synthesizing the corresponding set of the information items read out by the readout unit.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A drawing device that regards an object to be drawn as a collection of a plurality of polygons, and maps texture data onto the polygons, to thereby draw the object, the drawing device comprising:

a storage circuit comprising at least $(N-1)*(M-1)$ regions each storing in a continuously accessible way information items of four texture pixels in two adjacent columns and two adjacent rows of the texture data, wherein N and M represent the numbers of columns and rows of texture pixels constituting the texture data;

an address calculation circuit calculating an address where the information items constituting the texture data of a set of the texture pixels are stored based on texture coordinates corresponding to each pixel of the polygons;

a readout circuit reading out the set of the information items from the address calculated by said address calculation circuit; and a synthesis circuit synthesizing the set of the information items read out by said readout circuit using bilinear filtering, and wherein said storage circuit packs the texture data of the set of texture pixels into a set of data, and stores the set of data in the continuously-accessible region of said storage circuit, and said address calculation circuit calculates a texture address corresponding to an address by a region where the texture data of one texture pixel is stored based on texture coordinates corresponding to each pixel, and shifting the texture address left by two bits to thereby calculate the starting address of a region where the set of data corresponding to the texture coordinates are stored.

2. The drawing device according to claim 1, further comprising a drawing circuit for drawing, based on texture pixel information synthesized by said synthesis circuit, a corresponding pixel of the polygons.

3. The drawing device according to claim 1, further comprising a packing circuit for packing the set of the information items into a set of data, and storing the set of data in the continuously-accessible region of said storage circuit.

4. An information processing apparatus that regards an object to be drawn as a collection of a plurality of polygons, and maps texture data onto the polygons, to thereby draw the object, the information processing apparatus comprising:

a storage unit comprising at least $(N-1)*(M-1)$ regions each storing in a continuously accessible way information items of four texture pixels in two adjacent columns and two adjacent rows of the texture data, wherein N and M represent the numbers of columns and rows of texture pixels constituting the texture data;

an address calculation unit calculating an address where the information items constituting the texture data of a set of the texture pixels are stored based on texture coordinates corresponding to each pixel of the polygons;

a readout unit reading out the set of the information items from the address calculated by said address calculation unit; and a synthesis unit synthesizing the set of the information items read out by said readout unit using bilinear filtering, and wherein said storage circuit packs the texture data of the set of texture pixels into a set of data, and stores the set of data in the continuously-accessible region of said storage circuit, and said address calculation circuit calculates a texture address corresponding to an address by a region where the texture data of one texture pixel is stored based on texture coordinates corresponding to each pixel, and shifting the texture address left by two bits to thereby calculate the starting address of a region where the set of data corresponding to the texture coordinates are stored.

5. The information processing apparatus according to claim 4, further comprising a drawing unit for drawing, based on texture pixel information synthesized by said synthesis unit, a corresponding pixel of the polygons.

6. The information processing apparatus according to claim 4, further comprising a packing unit for packing the set of the information items into a set of data, and storing the set of data in the continuously-accessible region of said storage unit.

7. A drawing method associated with drawing an object as a collection of polygons where texture data is mapped onto the polygons, comprising:

storing information items in at least $(N-1)*(M-1)$ regions each storing in a continuously accessible way information items of four texture pixels in two adjacent columns and two adjacent rows of the texture data, wherein N and M represent the numbers of columns and rows of texture pixels; and calculating an address where the information items corresponding to a set of the texture pixels are stored based on texture coordinates corresponding to each pixel of the polygons, where the set of information items are read by an access to the continuously-accessible region;

wherein said storing includes packing the texture data of the set of the texture pixels into a set of data and storing the set of data in the continuously-accessible region, and said calculating includes calculating a texture address corresponding to an address by a region where the texture data of one texture pixel is stored, based on texture coordinates corresponding to each pixel and shifting the texture address left by two bits to thereby calculate the starting address of a region where the set of data corresponding to the texture coordinates are stored.

* * * * *